US009485562B2

(12) United States Patent
Mathieu et al.

(10) Patent No.: US 9,485,562 B2
(45) Date of Patent: Nov. 1, 2016

(54) CONTACTLESS RECHARGEABLE AUDIO HEADSET

(71) Applicant: PARROT, Paris (FR)

(72) Inventors: Jerome Mathieu, Paris (FR); David Tea, Lognes (FR)

(73) Assignee: PARROT, Paris (FR)

(*) Notice: Subject to any disclaimer, the term of this patent is extended or adjusted under 35 U.S.C. 154(b) by 0 days.

(21) Appl. No.: 14/860,511

(22) Filed: Sep. 21, 2015

(65) Prior Publication Data

US 2016/0094905 A1 Mar. 31, 2016

(30) Foreign Application Priority Data

Sep. 29, 2014 (FR) .................................... 14 59212

(51) Int. Cl.

*H04R 25/00* (2006.01)
*H04R 1/10* (2006.01)
*H02J 7/02* (2016.01)
*H02J 7/00* (2006.01)
*H04R 5/033* (2006.01)

(52) U.S. Cl.

CPC ........... *H04R 1/1025* (2013.01); *H02J 7/0042* (2013.01); *H02J 7/025* (2013.01); *H02J 50/10* (2016.02); *H04R 1/1008* (2013.01); *H04R 5/033* (2013.01)

(58) Field of Classification Search

CPC .. H04R 1/1025; H04R 1/1008; H04R 5/033; H02J 50/10; H02J 7/0042; H02J 7/025
See application file for complete search history.

(56) References Cited

U.S. PATENT DOCUMENTS

2012/0328119 A1* 12/2012 Heise .................. H04R 1/1066 381/74
2013/0082691 A1* 4/2013 Gelhard ................ H04R 5/033 324/200
2013/0223640 A1 8/2013 Urano
2015/0312670 A1* 10/2015 Candidus ............. G01R 33/288 181/129

FOREIGN PATENT DOCUMENTS

GB 1592468 A 7/1981

* cited by examiner

*Primary Examiner* — Tuan D Nguyen
(74) *Attorney, Agent, or Firm* — Haverstock & Owens LLP

(57) ABSTRACT

This headset comprises two earphones (10), each comprising a generally ring-shaped, flexible circumaural or supra-aural pad (16), mounted on a shell (14) receiving a transducer (30). The headset comprises an electronic circuitry powered by a battery, and a battery recharging circuit connected to at least one inductive-coupling recharging coil (20). The coil is housed in a pad (16), and it is housed in a region of the pad (16) that is close to an outer limit plane, on the wearer side, of the envelope (16*a*, 16*b*) of the pad, for example near a seam (C) between two portions (16*a*, 16*b*) of an envelope of the pad.

5 Claims, 2 Drawing Sheets

30
10 14
34 34
16b 16b
32
20 20
C C
16c 16a 16a 16c 13 12
10 13 10
S 16 16
20 20

CONTACTLESS RECHARGEABLE AUDIO HEADSET

The invention relates to the headsets incorporating embedded electronic circuits.

It may in particular be headsets provided with filtering and signal processing circuits (for example, circuits for the active reduction of the ambient noise) and/or receiving circuits for a wireless use of the headset, where the latter is coupled to a device such as an MP3 player, a radio, a smartphone, etc., by a link of the Bluetooth type (registered trademark of Bluetooth SIG) or another.

Such headsets typically contain a battery that must be regularly recharged. Wireless recharging systems for earphones are also known, but they require a very particular configuration.

Hence, the GB 1 592 468 A describes a recharging system for language laboratory headsets, using a receiving coil integrated to the shell of one of the earphones of each headset. The recharging is performed by introducing this earphone in a special compartment of a headset storage furniture. This compartment incorporates a primary coil, arranged so that the earphone is placed in the operating range of the coil to allow the wireless recharging of the headset.

The US 2013/0223640 A1 describes another wireless recharging system, where the headset is hung by its bow to a stand provided with a central recharging coil. One of the earphones includes a receiving coil mounted in the shell of the earphone, but on the inner side (i.e. on the side of the shell that is turned towards the ear), so as to be oriented towards the remote central coil.

These known devices are however not adapted to the very short range recharging systems, for example those which are compliant with the prescriptions of the "Qi" interface standard of the *Wireless Power Consortium,* used for recharging devices such as smartphones or portable game consoles, where it is just required to put the device on the plate of a suitable support base, integrating the recharging system with its emitting coil mounted under the plate.

This standard however provides that the distance between emitting and receiving coils is typically of at most 5 mm, preferably lower than or equal to 2.5 mm, to have a good inductive coupling between the two coils, and hence a satisfying yield of the wireless transmission of the recharging energy between the plate of the support base and the device to be recharged.

In the case of a smartphone or a game console, these devices have generally a planar face, useless in normal operation (generally, the back face of the device casing), against which the receiving coil of the device will be able to be applied, on the inner side of the casing. The distance between this coil and the recharging plate hence corresponds approximately to the thickness of the wall of the device casing, a distance that is very low and that hence ensures an excellent coupling between the two coils.

On the other hand, in the case of a headset, such a device has generally no useless planar face that could play the role of the back face of the smartphone or of the game console, but to give this configuration and this role to one of the outer faces of the shell of an earphone, which would not be satisfying as far as the style is concerned, because this face would be visible and even particularly exposed.

This is the problem that the present invention aims to solve.

The object of the invention is hence to propose a headset provided with a wireless recharging system compliant with the standards of the very sort range systems of the Qi type or the like, standards that impose a typical spacing between emitting coil (of the recharging base) and receiving coil (of the device to be recharged, in this case the headset) of at most 5 mm, preferably lower than or equal to 2.5 mm.

On the other hand, such a headset must be able to be recharged from any recharging base, from the moment that the latter is compliant with said standard, that is to say that the headset of the invention must not require a specific system for its recharging, unlike the headsets described by the above-mentioned GB 1 592 468 A1 and US 2013/0223640 A1, which can be recharged only from a specific storage furniture or support stand.

The recharging of the headset must further be able to be performed in a simple and reliable way by the user with no annoying handling and no particular precaution, that is to say that it must be sufficient for him to place the headset on the plate of a recharging base, with no other particular gesture.

The invention proposes for that purpose an audio headset of the general type described by the above-mentioned GB 1 592 468 A, comprising two earphones and a link element between the earphones. Each earphone comprises a shell receiving a transducer, and a generally ring-shaped, flexible circumaural or supra-aural pad. The headset comprises an electronic circuitry powered by a battery, and a battery recharging circuit connected to at least one inductive-coupling recharging coil.

Characteristically of the invention, the coil is housed in the pad of at least one of said earphones, in a region located near the free surface, opposite to the shell, of this pad, near an outer limit plane, on the wearer side, of the pad envelope, and the coil has such a deformability that it does not essentially impair the pad deformability.

The headset advantageously but optionally includes the following additional characteristics, considered individually or according to any technically possible combination:

- the coil is arranged in the region of the pad that is axially and radially adjacent to its aural opening;
- the coil is arranged near a seam between two portions of an envelope of the pad, said seam conforming the generally ring shape thereof;
- the free surface of the pad envelope, on the wearer side, is generally planar;
- the cross-section of the coil is flat, with a great axis contained in the plane of the coil.

An example of embodiment of the invention will now be described, with reference to the appended drawings in which the same references denote identical or functionally similar elements throughout the figures.

Figure 1:
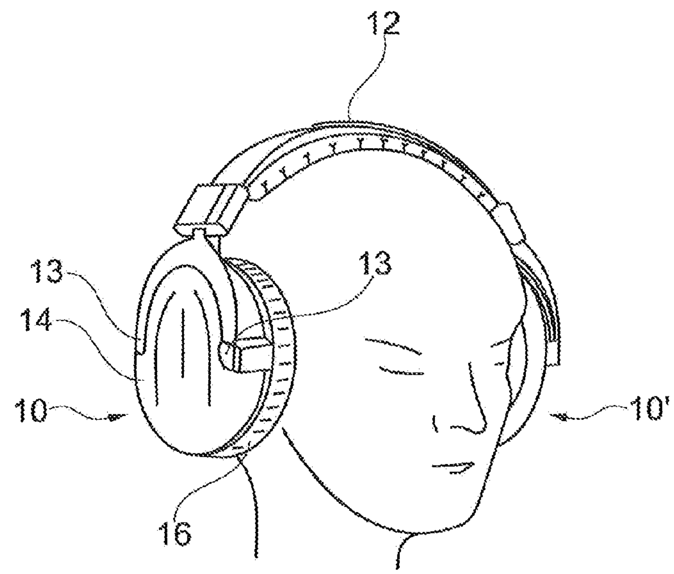
FIG. 1 is a perspective view of a headset according to the invention, placed on the head of a user.

With reference to the figures, in particular FIG. 1, an audio headset is shown, placed on the head of the user thereof.

This headset includes, in a manner conventional per se, two earphones 10, 10' connected by holding bow 12. The bow 12 is connected to the earphones through pivoting links 13 allowing a good fitting of the earphones on the user's head by adapting itself to the morphology thereof.

Figure 3:
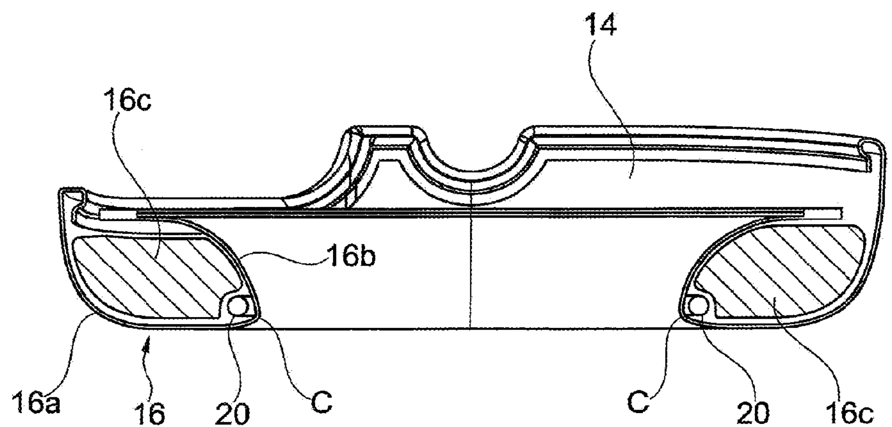
FIG. 3 is a cross-sectional view of a pad of the earphone of FIG. 2.

Each of the earphones 10, 10' comprises an outer shell 14 coming against the contour of the user's ear, with interposition, between the shell 14 and the periphery of the ear, of a flexible circumaural or supra-aural pad 16, of generally elliptic or circular contour, intended to ensure a satisfying acoustic isolation between the region of the ear and the outside sound environment. The pad 16 comprises a flexible envelope 16*a*, 16*b*, for example made of imitation leather or another material having similar properties of robustness and comfort, and a flexible stuffing 16*c*, for example foam or fibres, contained inside the envelope 16*a*, 16*b*. As shown in FIG. 3, a portion of the pad (the portion 16*a*) is axially continued towards the side of the shell 14 so as to laterally conform a portion of the latter.

Figure 2:
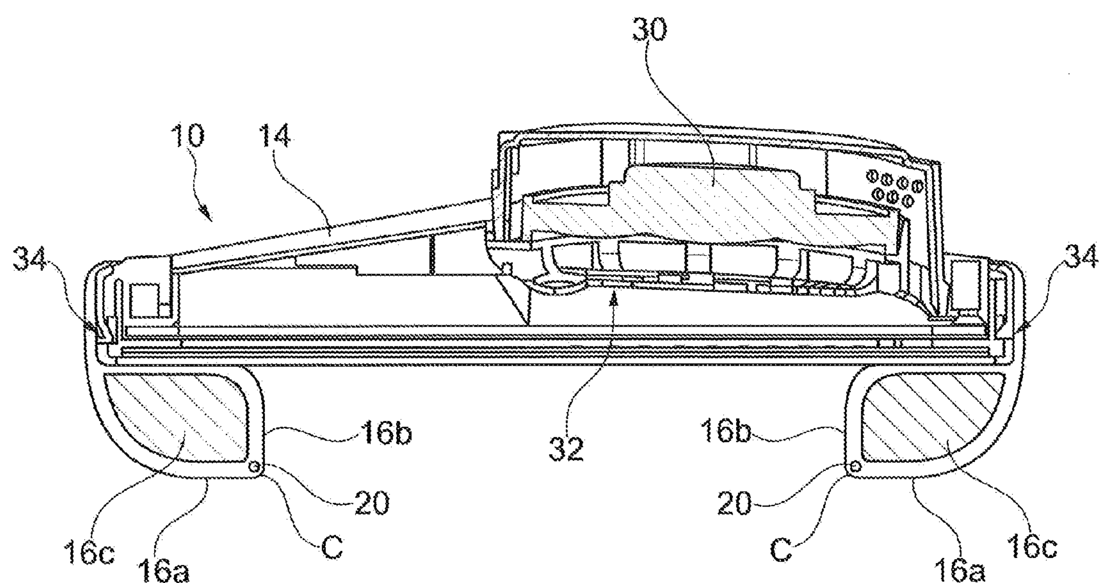
FIG. 2 is a partial cross-sectional view of one of the two earphones of the headset of FIG. 1.

In FIG. 2, the detail of one of the earphones is shown, with the shell 14 and its internal structure for the support of at least one transducer (herein a single transducer 30), as well as the structure 34 for the fixation of the pad 16, a fixation preferably made by clipping.

The shell 14 (or the opposite shell) also houses, in a manner that is not illustrated but known per se, a rechargeable battery and electronic circuits intended to ensure in particular the following functions:

wireless communication, for example according to the Bluetooth standard or the like, with an emitting station such as a computer, a tablet, etc., processing of the audio signals applied to the transducers, in particular circuit for ambient noise cancelling, totality correction, presence, application of effects, etc.; and recovery of the electric energy collected by an inductive coil that will be described hereinafter, and voltage level adaptation to perform the charging of the battery.

The auto headset moreover comprises, as the case may be, a control interface (touch pad, buttons, etc.), not illustrated, located on the outer surface, opposite to its pad 16, of one of the shells 14.

According to the invention, the audio headset is contactless rechargeable, and comprises for that purpose at least one coil for recovering the magnetic flow emitted by an external device, connected to the energy recovery and charging circuits.

Figure 5:
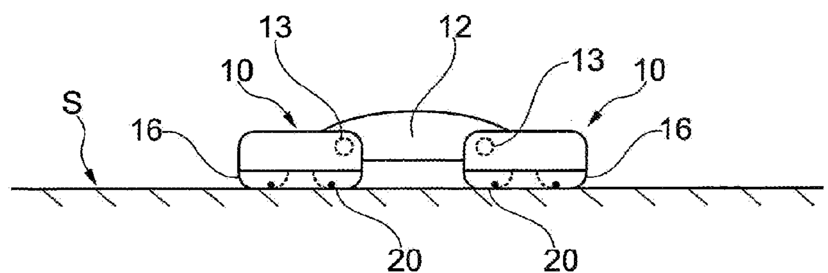
FIG. 5 is an elevation side view of an audio headset according to the invention resting on the surface of a wireless charging device.

More particularly, and as illustrated in particular in FIG. 5, the coil(s) are arranged in the headset such that the charging of the battery can be performed whereas the headset is on a planar recharging surface S, emitting in a manner known per se a magnetic flow, with its two pads 16 in contact with said recharging surface S.

For that purpose, and as illustrated in FIGS. 2 and 3, the coil, denoted by the reference 20, is placed in the external region of the pad 16, i.e. near the free surface thereof, opposite to the shell.

It is advantageous in this respect that said free surface of the pad is generally planar, as shown in FIGS. 2 and 3, such that, when the headset rests on the charging surface S with its pads 16 in contact with said surface, the distance between the coil 20 (or each coil in the case where each earphone is provided with a coil) is small enough to ensure a satisfying inductive coupling between the coils emitting the flow in the plate and the receiving coil(s) 16.

Typically, for a recharging made in compliance with the prescriptions of the "Qi" interface standard of the *Wireless Power Consortium,* this distance is lower than or equal to 2.5 mm, which can be obtained by integrating the coil of the pad 16 near a seam C between a pad portion 16*a* that is axially and radially external, and a pad portion 16*b* that is axially and radially internal.

The placement of the coil 20 near this seam C indeed allows to place the stuffing 16*c* of the pad, then to place the coil at the place indicated in FIGS. 2 and 3, then to make the seam C.

So as not to deteriorate the flexibility and the comfort of the pad, the coil has a cross-section and a flexibility that are compliant with these requirements. For that purpose, the coil 20 is performed by means of a copper wire of small section, typically comprises between about 0.07 and 0.2 $mm^2$, and the insulation between spires is a resin also having suitable flexibility characteristics. The number of spires of the coil, with the above-mentioned range of wire sections, is typically comprised between about 10 and 18 spires.

Moreover, the cross-section of the coil 20 may by either circular, as illustrated in FIGS. 2 and 3, or flat, with a great axis, preferably contained in the plane of the coil, to ensure a deformability that is the better adapted to the preservation of the comfort. The end strands of the coil 20 are connected to the energy recovery and charging circuit by passing either on the inner side of the pad 16, or on the outer side.

When the two earphones 10 of the headset are provided with a coil 20, the energy recovery and battery charging device, located in one of the shells 14, is connected to the coil of the opposite earphone by suitable leads passing through the bow 12.

Another advantage of the positioning of the coil 20 in the pad 16 lies in that the outer surface of shell 14, in particular the control interface thereof, and the circuits it houses have not to be modified in a limiting manner to receive the coil.

Still another advantage is that the flexibility of the pad 16, combined with the weight of the headset, allows a good application of this pad against the recharging surface, which would not be possible if the coil was placed on the side of the shell 14, generally made of rigid plastic material.

Figure 4:
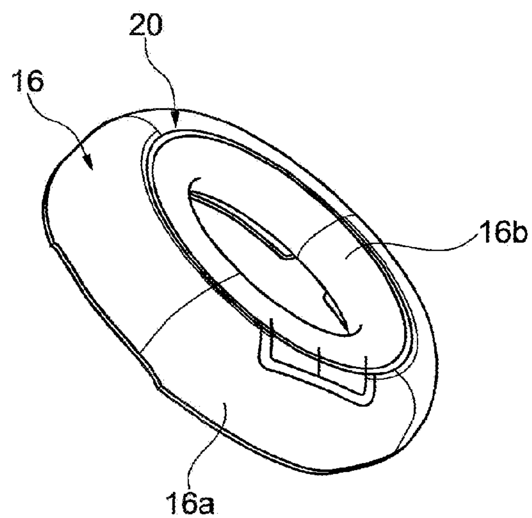
FIG. 4 is a perspective view of a pad of a headset according to the invention, having a different shape.

FIG. 4 illustrates a variant of the pad 16, with a section having a more rounded shape on the side of its free face intended to rest against the wearer's head. In this case, the coil 20 is placed near the apex of this rounded shape with, here again, the search for a distance that is the shortest possible between the coil and the recharging surface.

FIG. 5 shows the headset 10 resting against the surface of a wireless charging device, of suitable size and whose technical principles are known from the one skilled in the art.

It is observed that, thanks to the articulations 13 between the bow 12 and the earphones 10, the two coils 20 are placed flat against the charging surface S, which guarantees a satisfying inductive coupling and an all the more fast battery charging.

The invention claimed is:

1. An audio headset, comprising two earphones (10) and a link element (12) between the earphones, each earphone comprising a she (14) receiving a transducer (30), a generally ring-shaped, flexible circumaural or supra-aural pad (16), the headset comprising an electronic circuitry powered by a battery, and a battery recharging circuit connected to at least one inductive-coupling recharging coil (20), characterized in that said coil (20) is housed in the pad (16) of at least one of said earphones (10), in a region located near the free surface, opposite to the shell, of this pad, near an outer limit plane, on the wearer side, of the pad envelope (16*a*, 16*b*), and in that the coil (20) has such a deformability that it does not essentially impair the deformability of the pad (16).

2. The audio headset according to claim 1, characterized in that the coil (20) is arranged in the region of the pad (16) that is axially and radially adjacent to its aural opening.

3. The audio headset according to claim 1, wherein the coil (20) is arranged near a seam (C) between two portions (16*a,* 16*b*) of an envelope of the pad, said seam conforming the generally ring shape thereof.

4. The audio headset according to claim 1, wherein the free surface of the envelope (16*a,* 16*b*) of the pad (16), on the wearer side, is generally planar.

5. The audio headset according to claim 4, wherein the cross-section of the coil (20) is flat, with a great axis contained in the plane of the coil.

* * * * *